(No Model.)

H. F. HILLER.
STONE DRESSING MACHINE.

No. 547,993. Patented Oct. 15, 1895.

Witnesses:
O. F. Barthel
M. D. Dougherty

Inventor:
Henry F. Hiller,
By [signature]
Attorneys.

UNITED STATES PATENT OFFICE.

HENRY F. HILLER, OF DETROIT, MICHIGAN, ASSIGNOR OF TWO-THIRDS TO WILLIAM E. CURRIE AND HERBERT J. CONN, OF SAME PLACE.

STONE-DRESSING MACHINE.

SPECIFICATION forming part of Letters Patent No. 547,993, dated October 15, 1895.

Application filed January 29, 1895. Serial No. 536,570. (No model.)

*To all whom it may concern:*

Be it known that I, HENRY F. HILLER, a citizen of the United States, residing at Detroit, in the county of Wayne and State of Michigan, have invented certain new and useful Improvements in Stone-Dressing Machines, of which the following is a specification, reference being had therein to the accompanying drawings.

The invention consists in the construction, arrangement, and combination of the various parts, all as more fully hereinafter described.

Figure 1:
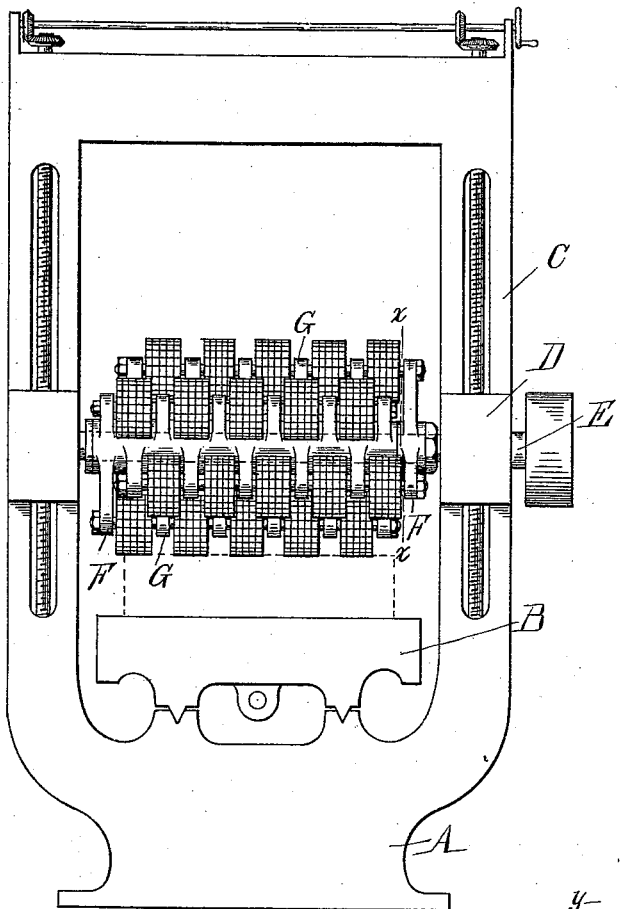
Figure 3:
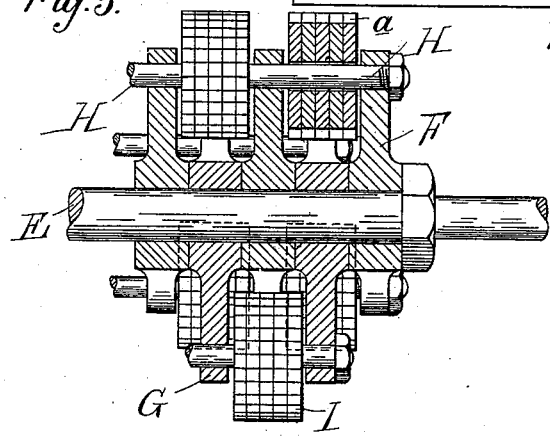
Figure 2:
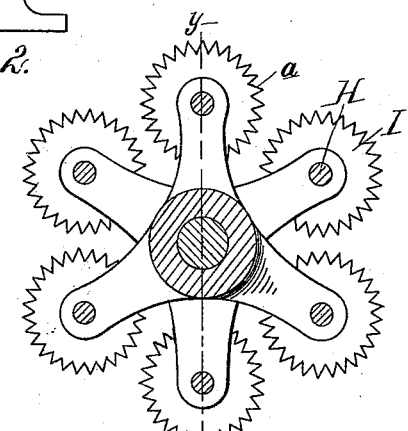

In the drawings, Figure 1 is a front elevation of a machine embodying my invention. Fig. 2 is a section on line $x\,x$. Fig. 3 is a section on line $y\,y$, Fig. 2.

A is the frame of the machine, on which is the reciprocating work-carriage B, driven in any suitable way. (Not shown.)

C represents standards carrying the vertically-adjustable blocks D, in which is journaled the cutter-shaft E, which is driven in any suitable manner. The cutter secured to this shaft consists of the heads F and spacing-plates G, the heads and plates being apertured in line to receive the bolts H, on which between the plates are arranged the rotatory disks I in groups, as shown, freely revolving on the shafts and preferably having pointed teeth $a$, as shown. The groups on the adjoining shafts around the cutter are preferably staggered, as shown. The parts being thus described, a stone being placed on the carriage, and the cutter adjusted to the desired height, motion is imparted to the carriage and to the cutter, and as the stone moves under the cutter the disks strike the highest points in the stone on its upper surface, dressing it down smoothly and quickly. By having rotatory cutting-disks I avoid danger of breaking them, even with high speed, and I obtain a very quick-working tool, easily constructed and repaired, and which can be used for a wide range of work. By using disks of different size it is evident that the cutting-faces may be varied in shape to produce various shapes in the surface of the stone, as well as to produce a plain dressing of the stone. In the prior state of the art such machines have been constructed, the shafts supporting the rollers being held in brackets on the outside of the cylinder. By constructing the spacing-plates as shown, comprising a central hub $c$ and radiating arms $b$, the arms of one plate being arranged opposite the space between the arms of the adjacent plate, and tying the arms which are in line together by the transverse bolts, I greatly simplify, cheapen, and strengthen the cylinder. This is necessary, as the strain it is subjected to is very great in dressing stone.

What I claim as my invention is—

In a stone dressing machine, a dressing cylinder comprising a shaft, a series of spacing plates, the spacing plates having a central hub and a series of radial arms, the arms of one plate being arranged opposite the space between the arms of the adjoining plates, clamping bolts passing through the ends of the arms of every alternate plate and those in line, and a series of disks journaled on the shafts between the alternate arms, in line with the intermediate plates.

In testimony whereof I affix my signature in presence of two witnesses.

HENRY F. HILLER.

Witnesses:
 JAMES WHITTEMORE,
 M. B. O'DOGHERTY.